United States Patent
Lin et al.

(10) Patent No.: US 8,520,720 B2
(45) Date of Patent: Aug. 27, 2013

(54) SPREAD SPECTRUM COMMUNICATION SYSTEM, CLEAR CHANNEL ASSESSMENT DEVICE AND RELATED METHOD

(75) Inventors: Yu-Nan Lin, Hsinchu (TW); Yin-Shao Chang, Miaoli County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 317 days.

(21) Appl. No.: 13/158,450

(22) Filed: Jun. 12, 2011

(65) Prior Publication Data
US 2011/0310934 A1 Dec. 22, 2011

(30) Foreign Application Priority Data
Jun. 17, 2010 (TW) .............................. 99119726 A

(51) Int. Cl.
*H04B 1/00* (2006.01)
(52) U.S. Cl.
USPC ........... 375/150; 375/267; 375/316; 375/324; 375/340; 375/347

(58) Field of Classification Search
USPC ................. 375/150, 260, 267, 316, 324, 340, 375/347
See application file for complete search history.

(56) References Cited

U.S. PATENT DOCUMENTS

| | | | |
|---|---|---|---|
| 2003/0007473 A1* | 1/2003 | Strong et al. | 370/338 |
| 2005/0047384 A1* | 3/2005 | Wax et al. | 370/338 |

* cited by examiner

*Primary Examiner* — Ted Wang
(74) *Attorney, Agent, or Firm* — Winston Hsu; Scott Margo

(57) ABSTRACT

A spread spectrum communication system includes a first and a second antenna, a first and a second radio frequency demodulator, a first and a second analog-to-digital converter, a first and a second filter, a clear channel assessment device, and a selection device. The radio frequency demodulators convert radio frequency signals to baseband signals, respectively. The analog-to-digital converters convert baseband signals to digital signals, respectively. The filters filter the first and second digital signals to generate filtered signals, respectively. The clear channel assessment device generates a channel assessment signal and a path selection signal according to signal characteristics of the filtered signals. The selection device refers to at least one of the channel assessment signal and path selection signal to selectively output one of the filtered signals, or generate no signal output.

16 Claims, 3 Drawing Sheets

SPREAD SPECTRUM COMMUNICATION SYSTEM, CLEAR CHANNEL ASSESSMENT DEVICE AND RELATED METHOD

BACKGROUND OF THE INVENTION

1. Field of the Invention

The present invention relates to a spread spectrum (SS) communication technique, and more particularly, to a spread spectrum communication system, a clear channel assessment (CCA) device utilizing a plurality of receiving paths for clear channel assessment, and a related method.

2. Description of the Prior Art

Spread spectrum is a communication technique of spreading the spectrum of a transmitted signal into a frequency band having a wider bandwidth, and is commonly used in wireless communication. Spread spectrum technique can be more stringently divided into two categories: the first being that, after spread spectrum modulation is performed, the signal transmission bandwidth is much larger than the original signal bandwidth; the second being that a transmitting end will employ a unique symbol, which does not affect transmitted data, and a receiving terminal also has to utilize the unique symbol to decode the spread spectrum to acquire the actual data transmitted from the transmitting end. There are also two commonly used spread spectrum methods: direct-sequence spread spectrum (DSSS) and frequency-hopping spread spectrum (FHSS). Spread spectrum communication technique is immune to background noise, interference and self multi-path interference, and influence from electromagnetic interference (EMI) is also minimal. Therefore, through the use of the spread spectrum technique, code division multiple access (CDMA) communication can be realized, which allows more users to independently utilize wider bandwidths at the same time.

To achieve better receiving quality, a receiving end of a spread spectrum communication system utilizes a rake receiver to receive signal power via different wireless communication paths; however, the rake receiver has to start operation after finishing channel assessment, and is of little help for signal processing (e.g., packet detection) before channel assessment. Since packet assessment is the most significant part in signal reception, if packets cannot be detected correctly, subsequent signal detection and processing operations also cannot proceed properly.

Please refer to FIG. 1, which is a diagram of a conventional spread spectrum communication system 100. The spread spectrum communication system 100 includes an antenna 110, a radio frequency demodulator 115, an analog-to-digital converter (ADC) 120, a digital finite impulse response (DFIR) filter, a clear channel assessment (CCA) device 140, a switch circuit 150, a rake receiver 160 and a symbol examination circuit 170. The antenna 110 is for receiving a radio frequency (RF) signal $S_{RF}$. The radio frequency demodulator 115 is coupled to the antenna 110, and is for demodulating the radio frequency signal $S_{RF}$ into an analog baseband signal $S_{BB}$. The ADC 120 is coupled to the radio frequency demodulator 115, and is for converting the analog baseband signal $S_{BB}$ into a digital signal $S_{dig}$. The DFIR filter 130 is coupled to the ADC 120, and is for filtering the digital signal $S_{dig}$ to generate a filtered signal $S_f$. The CCA device 140 is coupled to the DFIR filter 130, and is for generating a channel assessment signal $S_{cca}$ according to signal characteristics of the filtered signal $S_f$.

The switch circuit 150 is coupled to the CCA device 140, and is for referring to the channel assessment signal $S_{cca}$ to be selectively conducting (an "on" status) or non-conducting (an "off" status). The rake receiver 160 is coupled to the switch circuit 150, and is for receiving the filtered signal $S_f$ to generate a received signal $S_r$ when the switching circuit 150 is conducting. The symbol examination circuit 170 is coupled to the rake receiver 160, and is for performing symbol examination for the received signal $S_r$.

As shown in FIG. 1, the CCA device 140 includes a de-spreading processor 141, a switch 143, a first power calculator 145, a second power calculator 147 and a comparator 149. The de-spreading processor 141 is for receiving the filtered signal $S_f$ and performing a de-spreading process for the filtered signal $S_f$ to generate a de-spreading signal $S_{ds}$ accordingly. The switch 143 is coupled to the de-spreading processor 141, and refers to the de-spreading signal $S_{ds}$ to be selectively conducting or non-conducting. The first power calculator 145 is coupled to the switch 143, and is for receiving the de-spreading signal $S_{ds}$, and calculating the power of the de-spreading signal $S_{ds}$ to generate a first calculated value $C_1$. The second power calculator 147 is for receiving the filtered signal $S_f$ and calculating the power of the filtered signal $S_f$ to generate a second calculated value $C_2$. The comparator 149 is coupled to the first power calculator 145 and the second power calculator 147, and is for generating the channel assessment signal $S_{cca}$ according to the first calculated value $C_1$ and the second calculated value $C_2$.

The CCA device 140 can detect if there is a packet being transmitted by referring to signal characteristics of the filtered signal $S_f$. When a signal power after de-spreading (e.g., the calculated value $C_1$) is larger than a certain percentage of a signal power before de-spreading, the CCA device 140 determines that a packet is detected. At this moment, the CCA device 140 will control the switch circuit 150 to be conducting via the channel assessment signal $S_{cca}$, and activate the following rake receiver 160 and symbol examination circuit 170. Generally speaking, the rake receiver 160 can enhance signal detection quality; however, if the CCA device 140 cannot successfully detect a packet in time, the rake receiver 160 is unable to proceed to following operations.

SUMMARY OF THE INVENTION

Therefore, one of the objectives of the present invention is to provide a spread spectrum communication system, a clear channel assessment device utilizing a plurality of receiving paths for clear channel assessment, and related methods, in order to solve aforementioned problems encountered in the prior art.

According to an embodiment of the present invention, a spread spectrum system is disclosed. The spread spectrum communication system includes a first antenna, a second antenna, a first radio frequency demodulator, a second radio frequency demodulator, a first analog-to-digital converter (ADC), a second ADC, a first filter, a second filter, a clear channel assessment device and a selection device. The first antenna is for receiving a first radio frequency signal. The second antenna is for receiving a second radio frequency signal. The first radio frequency demodulator is coupled to the first antenna, and is for converting the first radio frequency signal into a first analog baseband signal. The second radio frequency demodulator is coupled to the second antenna, and is for converting the second radio frequency signal into a second analog baseband signal. The first ADC is coupled to the first radio frequency demodulator, and is for converting the first analog baseband signal into a first digital signal. The second ADC is coupled to the second radio frequency demodulator, and is for converting the second analog baseband signal into a second digital signal. The first filter is coupled to the first ADC, and is for filtering the first digital signal to generate a first filtered signal. The second filter is coupled to the second ADC, and is for filtering the second digital signal to generate a second filtered signal. The clear channel assessment device is coupled to the first filter and the second filter, and is for generating a channel assessment signal and a path selection signal according to signal characteristics of the first filtered signal and the second filtered signal. The selection device is coupled to the first filter, the second filter and the clear channel assessment device, and the selection device is for referring to at least one of the channel assessment signal and path selection signal to selectively output the first filtered signal, output the second filtered signal, or generate no signal output.

According to another embodiment of the present invention, a clear channel assessment device is disclosed. The clear channel assessment device includes a first input terminal, a second input terminal, a first de-spreading device, a second de-spreading device, a first switch, a second switch, a first power calculator, a second power calculator, a third power calculator, a fourth power calculator and a channel assessment comparator. The first input terminal is for receiving a first input signal. The second input terminal is for receiving a second input signal. The first de-spreading device is coupled to the first input terminal, and is for performing a de-spreading process for the first input signal to generate a first de-spreading signal. The second de-spreading device is coupled to the second input terminal, and is for performing a de-spreading process for the second input signal to generate a second de-spreading signal. The first switch is coupled to the first de-spreading device, and is selectively conducting or non-conducting according to the first de-spreading signal. The second switch is coupled to the second de-spreading device, and is selectively conducting or non-conducting according to the second de-spreading signal. The first power calculator is coupled to the first switch, and is for receiving the first de-spreading signal transmitted by the first switch when the first switch is conducting, and calculating a first calculated value according to a signal power of the first de-spreading signal. The second power calculator is coupled to the second switch, and is for receiving the second de-spreading signal transmitted by the second switch when the second switch is conducting, and calculating a second calculated value according to a signal power of the second de-spreading signal. The third power calculator is coupled to the first filter, and is for calculating a third calculated value according to a signal power of the first filtered signal. The fourth power calculator is coupled to the second filter, and is for calculating a fourth calculated value according to a signal power of the second filtered signal. The channel assessment comparator is coupled to the first power calculator, the second power calculator, the third power calculator and the fourth power calculator, and the channel assessment comparator is for generating the channel assessment signal according to the first calculated value, the second calculated signal, the third calculated signal and the fourth calculated signal.

According to yet another embodiment of the present invention, a spread spectrum communication method is disclosed. The spread spectrum communication method includes: deriving a first signal from a first antenna via a first path; deriving a second signal from a second antenna via a second path; generating a channel assessment signal and a path selection signal according to signal characteristics of the first signal and the second signal; and referring to at least one of the channel assessment signal and path selection signal to selectively output one of the first filtered signal, the second filtered signal, or generate no signal output.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
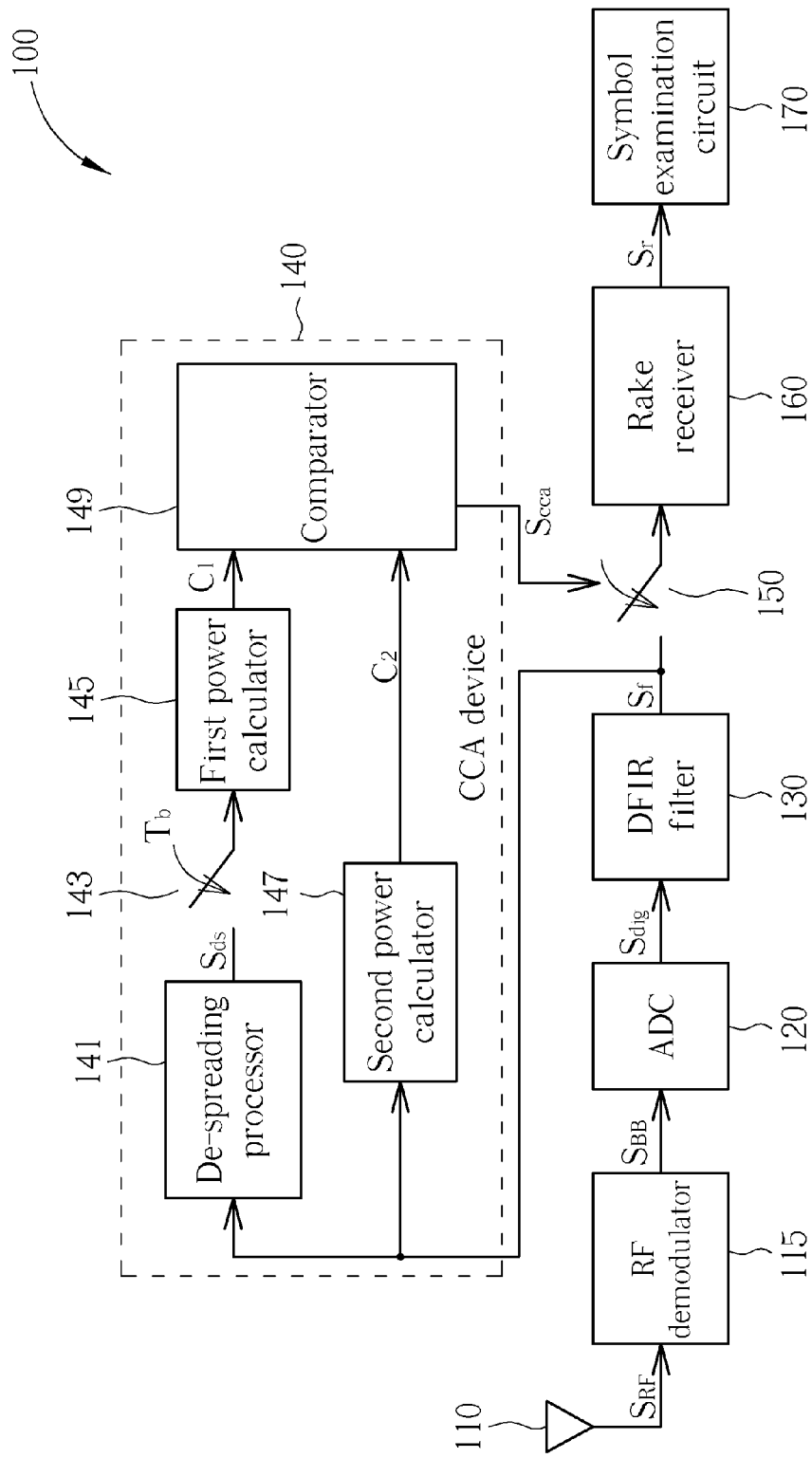
FIG. 1 is a diagram of a conventional spread spectrum communication system.
Figure 2:
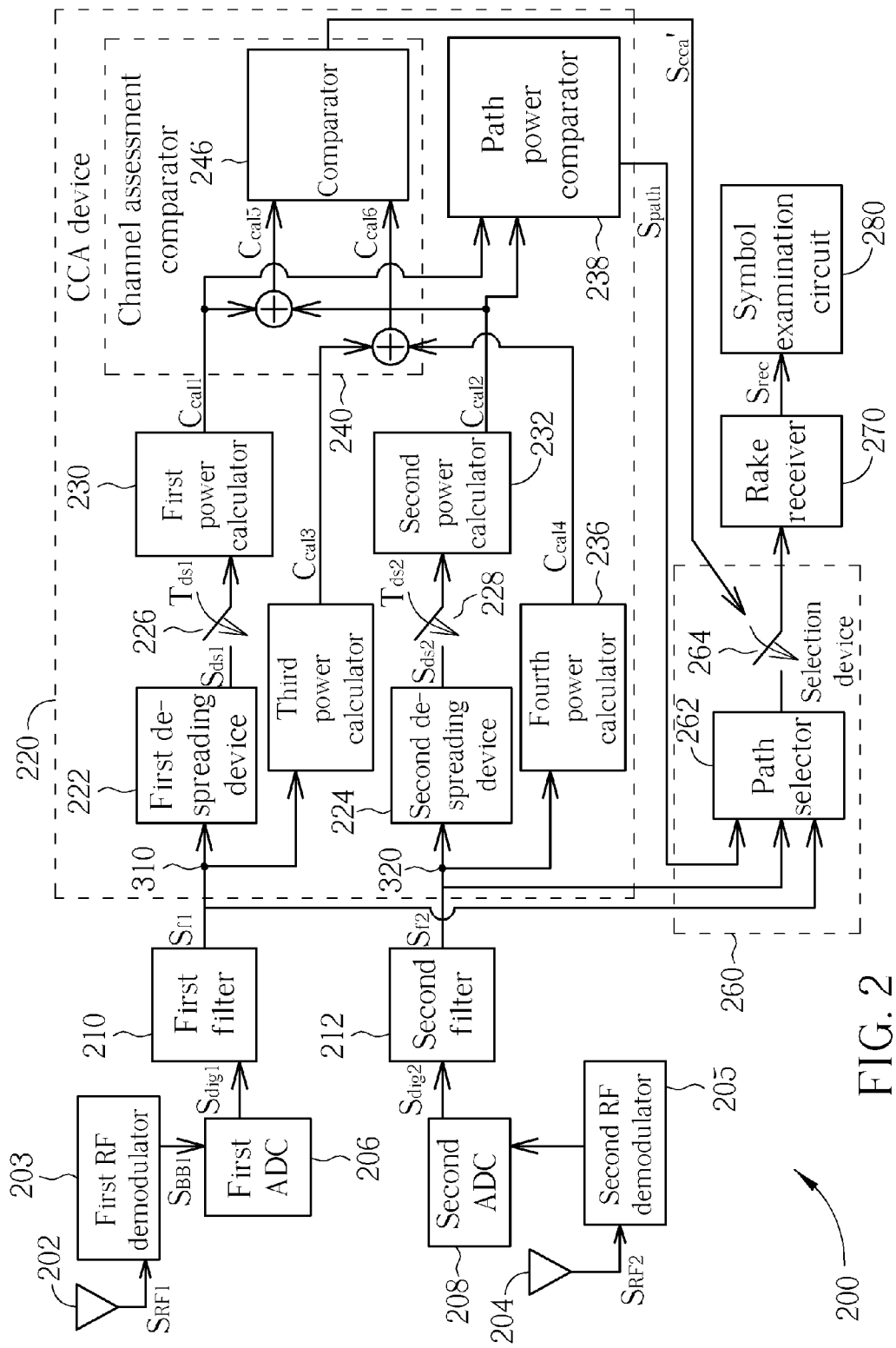
FIG. 2 is a diagram of a spread spectrum system according to an embodiment of the present invention.

Please refer to FIG. 2, which is a diagram of a spread spectrum system according to an embodiment of the present invention. The first antenna 202 receives a first radio frequency signal $S_{RF1}$. The first radio frequency demodulator 203 is coupled to the first antenna 202, and is for converting the first radio frequency signal $S_{RF1}$ into a first analog baseband signal $S_{BB1}$. The first analog-to-digital converter (ADC) 206 is coupled to the first radio frequency demodulator 203, and is for converting the first analog baseband signal $S_{BB1}$ into a first digital signal $S_{dig1}$. The second antenna 204 receives a second radio frequency signal $S_{RF2}$. The second radio frequency demodulator 205 is coupled to the second antenna 204, and is for converting the second radio frequency signal $S_{RF2}$ into a second analog baseband signal $S_{BB2}$. The second ADC 208 is coupled to the second radio frequency demodulator 205, and is for converting the second analog baseband signal $S_{BB2}$ into a second digital signal $S_{dig2}$. The first filter 210 is coupled to the first ADC 206, and is for filtering the first digital signal $S_{dig1}$ to generate a first filtered signal $S_{f1}$. The second filter 212 is coupled to the second ADC 208, and is for filtering the second digital signal $S_{dig2}$ to generate a second filtered signal $S_{f2}$.

The clear channel assessment (CCA) device 220 is coupled to the first filter 210 and the second filter 212, and is for generating a channel assessment signal $S_{cca}'$ and a path selection signal $S_{path}$ according to signal characteristics of the first filtered signal $S_{f1}$ and the second filtered signal $S_{f2}$. Please note that, in this embodiment, the process of converting the first radio frequency signal $S_{RF1}$ to the first filtered signal $S_{f1}$ and the process of converting the second radio frequency signal $S_{RF2}$ to the second filtered signal $S_{f2}$ may be performed simultaneously. The selection device 260 is coupled to the first filter 210, the second filter 212 and the CCA device 220, and the selection device 260 is for referring to at least one of the channel assessment signal $S_{cca}'$ and path selection signal $S_{path}$ to selectively output the first filtered signal $S_{f1}$, output the second filtered signal $S_{f2}$, or generate no signal output.

Please note that, in this embodiment, the first filter 210 and the second filter 212 may both be realized by digital finite impulse response (DFIR) filters; however, this is not supposed to be a limitation to the present invention. The first filter 210 and the second filter 212 may also be implemented with other kinds of filters according to different design requirements in other embodiments.

The CCA device 220 has a first input terminal 310 and a second input terminal 320 used for receiving a first input signal and a second input signal, respectively. In this embodiment, the first input terminal 310 is coupled to the first filter 210, and the second input terminal 320 is coupled to the second filter 212. Thus, the aforementioned first input signal is the first filtered signal $S_{f1}$ generated by the first filter 210, and the aforementioned second input signal is the second filtered signal $S_{f2}$ generated by the second filter 212. This example is for illustrative purposes only, and is not supposed to be a limitation to the present invention. Any communication system utilizing the CCA device 200 shown in FIG. 2 obeys the spirit of the present invention and accordingly falls within the scope of the present invention.

As shown in FIG. 2, the first de-spreading device 222 is coupled to the first filter 210 via the first terminal 310, and is for performing a de-spreading process for the first filtered signal $S_{f1}$ to thereby generate a first de-spreading signal $S_{ds1}$. The second de-spreading device 224 is coupled to the second filter 212 via the second terminal 320, and is for performing a de-spreading process for the second filtered signal $S_{f2}$ to thereby generate a second de-spreading signal $S_{ds2}$. The first switch 226 is coupled to the first de-spreading device 222, and is selectively conducting (an "on" status) or non-conducting (an "off" status) according to the first de-spreading signal $S_{ds1}$. The second switch 228 is coupled to the second de-spreading device 224, and is selectively conducting or non-conducting according to the second de-spreading signal $S_{ds2}$. A first power calculator 230 is coupled to the first switch 226, and is for receiving the first de-spreading signal $S_{ds1}$ transmitted via the first switch 226 when the first switch 226 is conducting, and calculating a first calculated value $C_{cal1}$ according to a signal power of the first de-spreading signal $S_{ds1}$. A second power calculator 232 is coupled to the second switch 228, and is for receiving the second de-spreading signal $S_{ds2}$ transmitted via the second switch 228 when the second switch 228 is conducting, and calculating a second calculated value $C_{cal2}$ according to a signal power of the second de-spreading signal $S_{ds2}$. A third power calculator 234 is coupled to the first filter 210, and is for calculating a third calculated value $C_{cal3}$ according to a signal power of the first filtered signal $S_{f1}$. A fourth power calculator 236 is coupled to the second filter 212, and is for calculating a fourth calculated value $C_{cal4}$ according to a signal power of the second filtered signal $S_{f2}$. A path power comparator 238 is coupled to the first power calculator 230, the second power calculator 232, the third power calculator 234 and the fourth power calculator 236, and is for generating the channel assessment signal $S_{cca}'$ according to the first calculated value $C_{cal1}$, the second calculated signal $C_{cal2}$, the third calculated signal $C_{cal3}$ and the fourth calculated signal $C_{cal4}$.

In this embodiment, a channel assessment comparator 240 includes (but is not limited to) a first adder 242, a second adder 244 and a comparator 246. The first adder 242 is coupled to the first power calculator 230 and the second power calculator 232, and is for summing up the first calculated value $C_{cal1}$ and the second calculated value $C_{cal2}$ to generate a fifth calculated value $C_{cal5}$. The second adder 244 is coupled to the third power calculator 234 and the fourth power calculator 236, and is for summing up the third calculated value $C_{cal3}$ and the fourth calculated value $C_{cal4}$ to generate a sixth calculated value $C_{cal6}$. The comparator 246 is coupled to the first adder 242 and the second adder 244, and is for comparing the fifth calculated value $C_{cal5}$ and the sixth calculated value $C_{cal6}$ to generate the channel assessment signal $S_{cca}'$.

In this embodiment, the selection device 260 includes (but is not limited to) a path selector 262 and a switch circuit 264. The path selector 262 is coupled to the first filter 210, the second filter 212 and the CCA device 220, and is for referring to the path selection signal $S_{path}$ to selectively output the first filtered signal $S_{f1}$ or the second filtered signal $S_{f2}$. The switch circuit 264 is coupled to the path selector 262, and is selectively conducting or non-conducting according to the channel assessment signal $S_{cca}'$. Please note that, in this embodiment, the path selector 262 may be implemented by a multiplexer; however, this is not supposed to be a limitation to the present invention. In fact, any device capable of providing signal selection functionality may be utilized to act as the path selector 262, and these kinds of variation in design also fall within the scope of the present invention. Additionally, in this embodiment, the switch circuit 264 is coupled to an output terminal of the path selector 262; however, this is also not a limitation to the present invention. For example, the selection device 260 can also be composed of two switch circuits and a path selector, where those switch circuits are coupled to different input terminals of the path selector. This kind of variation in design also falls within the scope of the present invention.

As shown in FIG. 2, the spread spectrum communication system 200 further includes a rake receiver 270 and a symbol examination circuit 280. The rake receiver 270 is coupled to the switch circuit 264, and is for receiving the first filtered signal $S_{f1}$ or the second filtered signal $S_{f2}$ via the path chosen by the selection device 260 to generate a received signal $S_{rec}$. The symbol examination circuit 280 is coupled to the rake receiver 270, and is for performing a symbol examination for the received signal $S_{rec}$.

Please note that, in this embodiment, the spread spectrum communication system 200 utilizes two different signal receiving paths to receive signals, and performs channel assessment and path selection according to signal powers received via two different paths; however, this example is only for illustrative purposes and is not supposed to be a limitation to the present invention. Utilizing a plurality of paths (i.e., more than two different paths) to receive signals and then performing channel assessment or path selection also falls within the scope of the present invention.

After the first antenna 202 and the second antenna 204 in the spread spectrum communication system 200 receive the radio frequency signal $S_{RF1}$ and the second radio frequency signal $S_{RF2}$, respectively, the selection device 260 will output different outcomes according to magnitudes of the first calculated value $C_{cal1}$, the second calculated value $C_{cal2}$, the third calculated value $C_{cal3}$, the fourth calculated value $C_{cal4}$, the fifth calculated value $C_{cal5}$ and the sixth calculated value $C_{cal6}$: if the first calculated value $C_{cal1}$ is larger than the second calculated value $C_{cal2}$, a path selection signal $S_{path1}$ generated by the path power comparator 238 will control the path selector 262 to output the first filtered signal $S_{f1}$; if the first calculated value $C_{cal1}$ is smaller than the second calculated value $C_{cal2}$, a path selection signal $S_{path2}$ generated by the path power comparator 238 will control the path selector 262 to output the second filtered signal $S_{f2}$; if the fifth calculated value $C_{cal5}$ is larger than a specific ratio of the six calculated value $C_{cal6}$, a channel assessment signal $S_{cca1}$ generated by the comparator 246 will control the switch circuit 264 to be conducting, and the following rake receiver 270 can thereby receive the first filtered signal $S_{f1}$ or the second filtered signal $S_{f2}$ via the path chosen by the path selector 262 to thereby generate the received signal $S_{rec}$, and then the symbol examination circuit 280 performs symbol examination for the received signal $S_{rec}$; if the fifth calculated value $C_{cal5}$ is not larger than a specific percentage of the six calculated value $C_{cal6}$, a channel assessment signal $S_{cca2}$ generated by the comparator 246 will control the switch circuit 264 to be non-conducting, and the following rake receiver 270 thereby will not receive any signal.

In addition, in the aforementioned embodiments, the CCA device 220 will generate the channel assessment signal and the path selection signal simultaneously/concurrently; however, this is for illustrative purposes only and is not supposed to be a limitation to the present invention. In other embodiments, the CCA device 220 may only generate the channel assessment signal or only generate the path selection signal/path comparison result; these kinds of variation in design also fall within the scope of the present invention.

Figure 3:
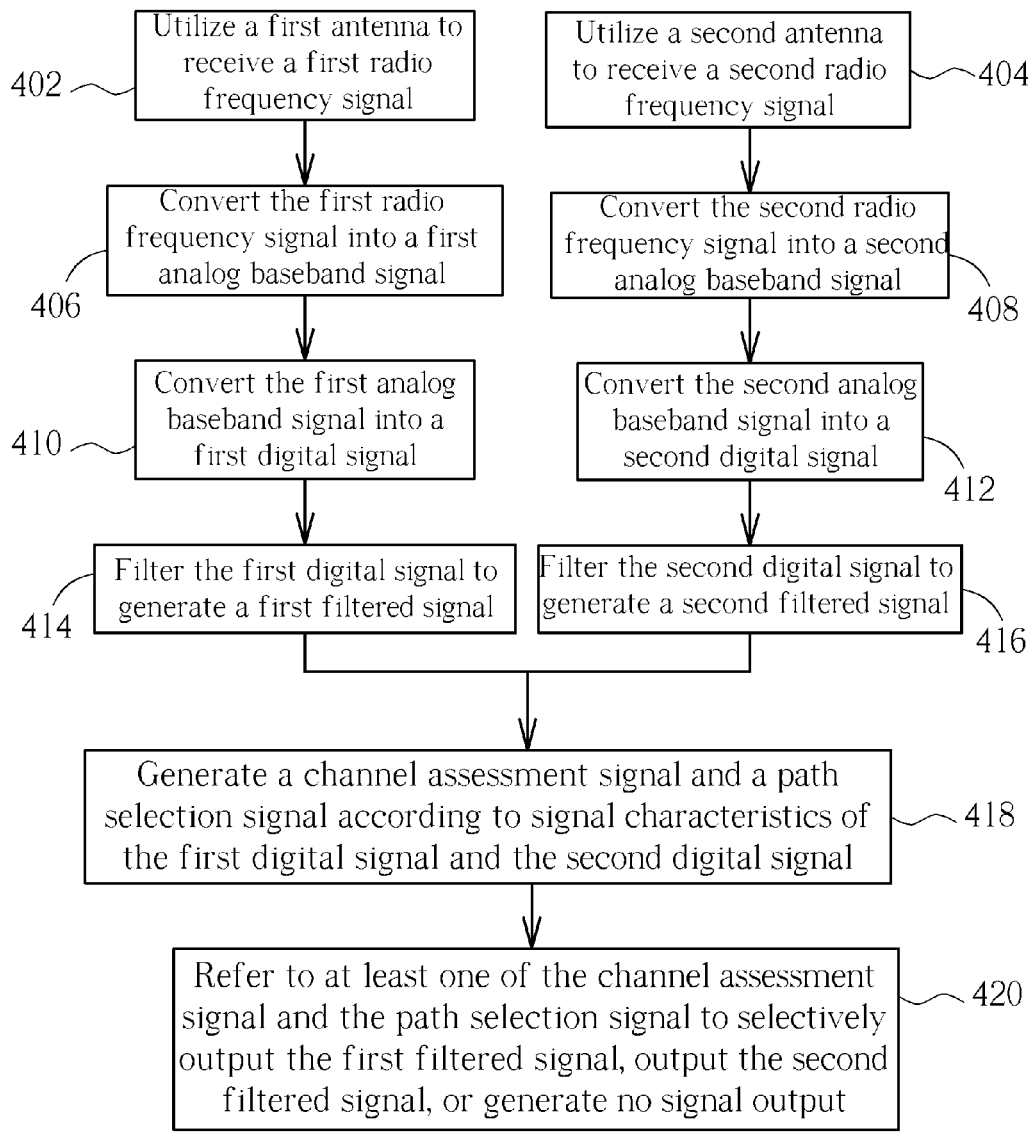
FIG. 3 is an exemplary flow chart of a spread spectrum communication method according to an embodiment of the present invention.

Please refer to FIG. 3, which is an exemplary flow chart of a spread spectrum communication method according to an embodiment of the present invention. Please note that if the result is substantially the same, the steps are not required to be executed in the exact order shown in FIG. 3. In addition, the steps in FIG. 3 are not required to be executed sequentially, i.e., other steps can be inserted in between. The steps are detailed as follows:

Step 402: Utilize a first antenna to receive a first radio frequency signal.

Step 404: Utilize a second antenna to receive a second radio frequency signal.

Step 406: Convert the first radio frequency signal into a first analog baseband signal.

Step 408: Convert the second radio frequency signal into a second analog baseband signal.

Step 410: Convert the first analog baseband signal into a first digital signal.

Step 412: Convert the second analog baseband signal into a second digital signal.

Step 414: Filter the first digital signal to generate a first filtered signal.

Step 416: Filter the second digital signal to generate a second filtered signal.

Step 418: Generate a channel assessment signal and a path selection signal according to signal characteristics of the first digital signal and the second digital signal.

Step 420: Refer to at least one of the channel assessment signal and the path selection signal to selectively output the first filtered signal, output the second filtered signal, or generate no signal output.

Regarding the exemplary spread spectrum communication method provided in this embodiment, a first signal and a second signal are derived from a first antenna and a second antenna via a first path and a second path, respectively (steps 402-416). As illustrated by the spread spectrum communication system 200 in FIG. 2, the first radio frequency signal $S_{RF1}$ is received from the first antenna 202, and then the first radio frequency signal $S_{RF1}$ goes through the first radio frequency demodulator 203, the first ADC 206 and the first filter 210 and is converted into the first filtered signal $S_{f1}$. In this exemplary embodiment, the first path is a signal path in which the first radio frequency demodulator 203, the first ADC 206 and the first filter 210 are disposed, and the first signal is the first filtered signal $S_{f1}$. Likewise, the second path is a signal path in which the second radio frequency demodulator 205, the second ADC 208 and the second filter 212 are disposed, and the second signal is the second filtered signal $S_{f2}$. After the first filtered signal $S_{f1}$ and the second filtered signal $S_{f2}$ are derived, the path power comparator 238 is utilized to generate the path selection signal $S_{path}$ (step 418). Finally, in step 420, an output signal is generated by referring to the path selection signal (i.e., the path selection signal $S_{path}$) to selectively output the first signal (i.e., the first filtered signal $S_{f1}$) or the second signal (i.e., the second filtered signal $S_{f2}$), and the output signal is selectively outputted by referring to the channel assessment signal. Since a person skilled in the pertinent art should readily understand operations of the steps in FIG. 3 after reading the above description directed to the spread spectrum communication system 200 in FIG. 2, further details are omitted here for brevity.

To summarize, the present invention provides a spread spectrum communication system, a clear channel assessment apparatus and related method. The spread spectrum system and the clear channel assessment apparatus of the present invention receive signals via a plurality of receiving paths and a plurality of input terminals, calculate powers of the received signals before and after de-spreading, and then perform channel assessment as well as path selection according to calculation results to thereby provide more reliable examination results. As to influencing factors such as the transmitting ends being located far away or ambient environment interference, the present invention can provide stable receiving performance when the signal energy received by the receiving end of the system/apparatus is very weak, and therefore can choose a better receiving path for signal reception.

Those skilled in the art will readily observe that numerous modifications and alterations of the device and method may be made while retaining the teachings of the invention.

What is claimed is:

1. A spread spectrum communication system, comprising:
   a first antenna, arranged for receiving a first radio frequency signal;
   a second antenna, arranged for receiving a second radio frequency signal;
   a first radio frequency demodulator, coupled to the first antenna, for converting the first radio frequency signal into a first analog baseband signal;
   a second radio frequency demodulator, coupled to the second antenna, for converting the second radio frequency signal into a second analog baseband signal;
   a first analog-to-digital converter (ADC), coupled to the first radio frequency demodulator, for converting the first analog baseband signal into a first digital signal;
   a second ADC, coupled to the second radio frequency demodulator, for converting the second analog baseband signal into a second digital signal;
   a first filter, coupled to the first ADC, for filtering the first digital signal to generate a first filtered signal;
   a second filter, coupled to the second ADC, for filtering the second digital signal to generate a second filtered signal;
   a clear channel assessment (CCA) device, coupled to the first filter and the second filter, for generating a channel assessment signal and a path selection signal according to signal characteristics of the first filtered signal and the second filtered signal; and
   a selection device, coupled to the first filter, the second filter and the CCA device, for referring to at least one of the channel assessment signal and the path selection signal to selectively output the first filtered signal, output the second filtered signal, or generate no signal output.

2. The spread spectrum communication system of claim 1, wherein the selection device comprises:
   a path selector, coupled to the first filter, the second filter and the CCA device, for referring to the path selection signal to selectively output the first filtered signal or the second filtered signal; and
   a switch circuit, coupled to an output terminal of the path selector, for being selectively conducting or non-conducting according to the channel assessment signal.

3. The spread spectrum communication system of claim 1, wherein the CCA device comprises:
   a first de-spreading device, coupled to the first filter, for performing a de-spreading process for the first filtered signal to generate a first de-spreading signal;
   a second de-spreading device, coupled to the second filter, for performing a de-spreading process for the second filtered signal to generate a second de-spreading signal;
   a first switch, coupled to the first de-spreading device, for being selectively conducting or non-conducting according to the first de-spreading signal;
   a second switch, coupled to the second de-spreading device, for being selectively conducting or non-conducting according to the second de-spreading signal;
   a first power calculator, coupled to the first switch, for receiving the first de-spreading signal transmitted via the first switch when the first switch is conducting, and calculating a first calculated value according to a signal power of the received first de-spreading signal;
   a second power calculator, coupled to the second switch, for receiving the second de-spreading signal transmitted via the second switch when the second switch is conducting, and calculating a second calculated value according to a signal power of the received second de-spreading signal;
   a third power calculator, coupled to the first filter, for calculating a third calculated value according to a signal power of the first filtered signal;
   a fourth power calculator, coupled to the second filter, for calculating a fourth calculated value according to a signal power of the second filtered signal;
   a path power comparator, coupled to the first power calculator and the second power calculator, for generating the path selection signal by comparing the first calculated value and the second calculated value; and
   a channel assessment comparator, coupled to the first power calculator, the second power calculator, the third power calculator and the fourth power calculator, for generating the channel assessment signal according to the first calculated value, the second calculated signal, the third calculated signal and the fourth calculated signal.

4. The spread spectrum communication system of claim 3, wherein the channel assessment comparator comprises:
   a first adder, coupled to the first power calculator and the second power calculator, for summing up the first calculated value and the second calculated value to generate a fifth calculated value;
   a second adder, coupled to the third power calculator and the fourth power calculator, for summing up the third calculated value and the fourth calculated value to generate a sixth calculated value; and
   a comparator, coupled to the first adder and the second adder, for comparing the fifth calculated value and the sixth calculated value to generate the channel assessment signal.

5. The spread spectrum communication system of claim 1, further comprising:
   a rake receiver, coupled to the selection device, for receiving the first filtered signal or the second filtered signal via a path chosen by the selection device and accordingly generating a received signal; and
   a symbol examination circuit, coupled to the rake receiver, for performing a symbol examination for the received signal.

6. The spread spectrum communication system of claim 1, wherein the first filter and the second filter are both digital finite impulse response (DFIR) filters.

7. A clear channel assessment (CCA) device, comprising:
   a first input terminal, arranged for receiving a first input signal;
   a second input terminal, arranged for receiving a second input signal;
   a first de-spreading device, coupled to the first input terminal, for performing a de-spreading process for the first input signal to generate a first de-spreading signal;
   a second de-spreading device, coupled to the second input terminal, for performing a de-spreading process for the second input signal to generate a second de-spreading signal;
   a first switch, coupled to the first de-spreading device, for being selectively conducting or non-conducting according to the first de-spreading signal;
   a second switch, coupled to the second de-spreading device, for being selectively conducting or non-conducting according to the second de-spreading signal;
   a first power calculator, coupled to the first switch, for receiving the first de-spreading signal transmitted via the first switch when the first switch is conducting, and calculating a first calculated value according to a signal power of the received first de-spreading signal;
   a second power calculator, coupled to the second switch, for receiving the second de-spreading signal transmitted via the second switch when the second switch is conducting, and calculating a second calculated value according to a signal power of the received second de-spreading signal;
   a third power calculator, coupled to the first filter, for calculating a third calculated value according to a signal power of the first filtered signal;
   a fourth power calculator, coupled to the second filter, for calculating a fourth calculated value according to a signal power of the second filtered signal; and
   a channel assessment comparator, coupled to the first power calculator, the second power calculator, the third power calculator and the fourth power calculator, for generating the channel assessment signal according to the first calculated value, the second calculated signal, the third calculated signal and the fourth calculated signal.

8. The CCA device of claim 7, further comprising:
   a channel power comparator, coupled to the first power calculator and the second power calculator, for comparing the first calculated value and the second calculated value to generate a comparison result.

9. The CCA device of claim 7, wherein the channel assessment comparator comprises:
   a first adder, coupled to the first power calculator and the second power calculator, for summing up the first calculated value and the second calculated value to generate a fifth calculated value;
   a second adder, coupled to the third power calculator and the fourth power calculator, for summing up the third calculated value and the fourth calculated value to generate a sixth calculated value; and a comparator, coupled to the first adder and the second adder, for comparing the fifth calculated value and the sixth calculated value to generate the channel assessment signal.

10. A spread spectrum communication method, comprising:
deriving a first signal from a first antenna via a first path;
deriving a second signal from a second antenna via a second path;
generating a channel assessment signal and a path selection signal according to signal characteristics of the first signal and the second signal; and
referring to at least one of the channel assessment signal and path selection signal to selectively output the first filtered signal, output the second filtered signal, or generate no signal output.

11. The spread spectrum communication method of claim 10, wherein the step of referring to at least one of the channel assessment signal and path selection signal to selectively output the first filtered signal, output the second filtered signal, or generate no signal output comprises:
referring to the path selection signal to selectively output the first filtered signal or the second filtered signal and accordingly generating an output signal; and
referring to the channel assessment signal to selectively output the output signal.

12. The spread spectrum communication method of claim 10, wherein the step of generating the channel assessment signal and the path selection signal according to signal characteristics of the first signal and the second signal comprises:
performing a de-spreading process for the first signal to generate a first de-spreading signal;
performing the de-spreading process for the second signal to generate a second de-spreading signal;
referring to a period of the first de-spreading signal to selectively output the first de-spreading signal, and calculating a signal power of the first de-spreading signal to generate a first calculated value;
referring to a period of the second de-spreading signal to selectively output the second de-spreading signal, and calculating a signal power of the second de-spreading signal to generate a second calculated value;
calculating a signal power of the first signal to generate a third calculated value;
calculating a signal power of the second signal to generate a fourth calculated value;
comparing the first calculated value and the second calculated value to generate the path selection signal; and
generating the channel assessment signal according to the first calculated value, the second calculated value, the third calculated value and the fourth calculated value.

13. The spread spectrum communication method of claim 12, wherein the step of generating the channel assessment signal according to the first calculated value, the second calculated value, the third calculated value and the fourth calculated value comprises:
summing up the first calculated value and the second calculated value to generate a fifth calculated value;
summing up the third calculated value and the fourth calculated value to generate a sixth calculated value; and
comparing the fifth calculated value and the sixth calculated value to generate the channel assessment signal.

14. The spread spectrum communication method of claim 10, further comprising:
utilizing a rake receiver to receive the first signal or the second signal via a path chosen by the path selection signal to generate a received signal; and
performing a symbol examination for the received signal.

15. The spread spectrum communication method of claim 10, wherein the step of deriving the first signal from the first antenna via the first path comprises:
utilizing the first antenna to receive a first radio frequency signal;
converting the first radio frequency signal into a first analog baseband signal;
converting the first analog baseband signal into a first digital signal; and
filtering the first digital signal to generate a first filtered signal as the first signal.

16. The spread spectrum communication method of claim 10, wherein the step of deriving the second signal from the second antenna via the second path comprises:
utilizing the second antenna to receive a second radio frequency signal;
converting the second radio frequency signal into a second analog baseband signal;
converting the second analog baseband signal into a second digital signal; and
filtering the second digital signal to generate a second filtered signal as the second signal.

* * * * *